United States Patent Office 3,344,112
Patented Sept. 26, 1967

3,344,112
POLYMERIC COMPOSITIONS CONTAINING BIS(2 - BROMOETHYL)2 - CHLOROETHYL PHOSPHATE
Gail H. Birum, Kirkwood, Mo., James L. Schwendeman, Dayton, Ohio, and Richard M. Anderson, St. Louis, Mo., assignors to Monsanto Company, a corporation of Delaware
No Drawing. Filed Aug. 7, 1963, Ser. No. 300,681
8 Claims. (Cl. 260—45.7)

This application is a continuation-in-part of application Ser. No. 58,192, filed Sept. 26, 1960, now U.S. Patent 3,132,169.

This invention relates to organic polymeric compositions and more particularly provides novel polymeric compositions having increased resistance to burning and a method for rendering polymeric compositions flame-retardant.

More particularly this invention provides organic polymer compositions comprising a natural or synthetic, linear or cross-linked polymer in contact with up to an equal amount, based on the weight of the polymer of bis(2-bromoethyl)-2-chloroethyl phosphate.

The phosphate ester component of the compositions of this invention, described above, may be prepared by treating with bromine, 2-chloro-1,3,2-dioxaphospholane of the formula

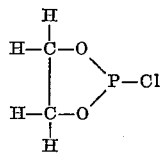

to obtain a phosphorobromidochloridate of the formula

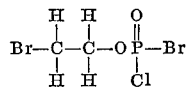

and then treating the phosphorobromidochloridate thus obtained with a sufficient amount of ethylene oxide to react with each of the bromine and chlorine atoms bonded directly to the phosphorus atom.

Additional details relative to the preparation of the phosphate ester component of the compositions of this invention are found in co-pending application Ser. No. 58,192, filed Sept. 26, 1960, now U.S. Patent 3,132,169, which is incorporated herein by reference.

Bis(2-bromoethyl)2-chloroethyl phosphate is particularly useful as a modifier for natural and synthetic poly-
degree of utility as a flame-retardant for polymeric mate-
degre of utility as a flame-retardant for polymeric materials. At the same time, depending upon the quantity of the mixed ester which is in contact with the polymer, a plasticizing or softening effect is obtained. Thus, at, say, a 10% to 50% concentration of the phosphate, based on the total of polymer and phosphate, the polymer generally not only is flame-proofed but also plasticized. Use of the present phosphate at much lower concentrations, say, in an amount which in some cases is as low as 1.0%, provides many polymeric systems with reduced flammability. The present phosphate may be used with the polymers in a quantity which is equal to that of the polymer, but in most instances favorable results with respect to improvement in flame-retardance and/or plasticity is obtained at concentrations which are definitely lower. It will be evident, of course, that for the preparation of plastisols, quantities of the phosphate which are greater than that of the polymer will be required. Use of the present phosphorus compound with the polymeric materials in quantities which confer beneficial properties to the polymers with respect to a desired effect, e.g., flexibility in the case of a film, flame-proofing in the case of foam insulators and extruded fibers or molded pieces, often confers to the polymer an improvement also in such characteristics as resistance to impact, improved flow, moldability, etc. These varied effects are readily determinable by those skilled in the art simply by visual observation or by use of conventional techniques. Hence in order to arrive at optimum beneficial effect suited to the purposes for which the polymeric composition is designed, only routine testing, involving variation of adjuvant quantity, is generally required.

Fibrous cellulosic products are prime examples of the natural polymeric materials which are advantageously modified by the present phosphate. This includes products made of cotton, linen, regenerated cellulose, kapok, hemp, wood and wood pulp, e.g., textiles, twines, paper, cardboard, pressed board, batting wood flour, sawdust, etc. Another group of natural polymers of carbohydrate origin includes the starches such as those derived from corn, barley, potato and cassava. Another class of natural polymers with which the present phosphate is beneficially used are the natural gums, e.g., agar, gum arabic, psyllium seed, tragacanth and gum karaya. Natural rubber is also included. Natural resins modified by the present phosphate include shellac, copal, damar, pine balsam, rosin, etc. Proteinaceous polymeric materials, e.g., animal glue, casein, wool and leather are also advantageously modified by said phosphorus compound. The natural polymeric products, generally, are rendered flame-retardant when contacted with the present phosphate in appropriate proportions, and worthy of special comment is the glow-proofing of readily ignitible dusts and powders prepared from the natural polymers. Plasticizing effect is conferred by the present phosphate to those of the polymers which lack the degrees of softness and flexibility that are required in the applications for which the polymers are destined. When cotton fibers or textiles are treated with the phosphate compound, there is not only flame-retardant effect but also an improvement in the "hand" or feel of the fabric.

Synthetic polymeric materials, i.e., those high molecular weight materials which are not found in nature, with which the present phosphate is advantageously employed may be either linear or cross-linked polymers and they may be either those which are produced by addition polymerization or by condensation.

An important class of polymers which are beneficially modified according to the invention are those obtained from a polymerizable monomer compound having ethylenic unsaturation.

A particularly preferred class consists of the polymerized vinyl and vinylidene compounds, i.e., those having the

radical. Compounds having such a radical are, e.g., the solid polymeric alkenes, such as polyethylene, polypropylene, polyisobutylene or ethylenepropylene copoylmer; polymerized acrylyl and alkacrylyl compounds such as acrylic, chloroacrylic and methacrylic acids, anhydrides, esters, nitriles and amides, for example, acrylonitrile, ethyl or butyl acrylate, methyl or ethyl methacrylate, methoxymethyl or 2-(2-butoxyethoxy)-ethyl methacrylate; 2-(cyanoethoxy)ethyl 3-(3-cyanopropoxy)-propyl acrylate or methacrylate, 2-(diethylamino)ethyl or 2-chloroethyl acrylate or methacrylate, acrylic anhydride or methacrylic anhydride; methacrylamide or chloroacrylamide, ethyl or butyl chloroacrylate; the olefinic aldehydes such as acrolein, methacrolein and their acetals; the vinyl and vinylidene halides such as vinyl chloride, vinyl fluoride, vinylidene fluoride and 1-chloro-1-fluoroethylene; polyvinyl alcohol; the vinyl carboxylates such as vinyl acetate, vinyl chloroacetate, vinyl propionate, and vinyl 2-ethylhexanoate; the N-vinyl imides such as N-vinylphthalimide and N-vinylsuccinimide; the N-vinyllactams such as N-vinylcaprolactam and N-vinylbutyrolactam; the vinyl aromatic hydrocarbon compounds such as styrene, alpha-methylstyrene, 2,4-dichlorostyrene, alpha- or beta-vinylnaphthalene, divinylbenzene and vinylfluorene; the vinyl ethers such as ethyl vinyl ether or isobutyl vinyl ether; vinyl-substituted heterocyclic compounds such as vinylpyridine, vinylpyrrolidone, vinylfuran or vinylthiophene; the vinyl or vinylidene ketones such as methyl vinyl ketone or isopropenyl ethyl ketone; vinylidene cyanide; etc. Homopolymers of the above compounds or copolymers or terpolymers thereof are beneficially modified by the present phosphate. Examples of such copolymers or terpolymers are those obtained by polymerization of the following monomer mixtures: vinyl chloride-vinyl acetate, acrylonitrile-vinylpyridine, styrene-methyl methacrylate; styrene-N-vinylpyrrolidone, cyclohexyl methacrylate-vinyl chloroacetate, acrylonitrile-vinylidene cyanide, methyl methacrylate-vinyl acetate, ethyl acrylate-methacrylamide-ethyl chloroacrylate, vinyl chloride-vinylidene chloride-vinyl acetate, etc.

Other presently employed polymers of compounds having the ethylenic group

are the homopolymers, copolymers and terpolymers of the alpha-beta-olefinic dicarboxylic acids and the derivatives thereof such as the anhydrides, esters, amides, nitriles and imides, e.g., methyl, butyl, 2-ethylhexyl or dodecyl fumarate or maleate, maleic, chloromaleic, citraconic or itaconic anhydride, fumaronitrile, dichlorofumaronitrile or citracononitrile, fumaramide, or maleamide; maleimide or N-phenylmaleimide, etc. Examples of particularly useful copolymers and terpolymers prepared from the alpha,beta-olefinic dicarboxy compounds are the copolymers of maleic anhydride and a vinyl compound such as ethylene, propylene, isobutylene, styrene, alpha-methylstyrene, vinyl acetate, vinyl propionate, methyl isopropenyl ketone, isobutyl vinyl ether, etc., the copolymers of dialkyl fumarate such as ethyl or butyl fumarate and a vinyl compound such as styrene, vinyl acetate, vinylidene chloride, ethyl methacrylate, acrylonitride, etc.

Readily and advantageously modified by the present phosphate are also the polymers and copolymers of unsaturated, cyclic esters of carbonic acid, e.g., homopolymeric vinylene carbonate or the copolymers of vinylene carbonate with ethylenic compounds such as ethylene, vinyl chloride, vinyl acetate, 1,3-butadiene, acrylonitrile, methacrylonitrile, or the esters of methacrylic or acrylic acid.

Advantageously modified by the present phosphate are also polymers, copolymers or terpolymers or polymerizable compounds having a plurality of double bonds, e.g., a rubbery, conjugated diene polymerizate such as homopolymerized 2,3-butadiene, 2-chlorobutadiene or isoprene and linear copolymers or terpolymers such as butadiene-acrylonitrile copolymer, isobutylene-butadiene copolymer (butyl rubber) butadiene-styrene copolymer or 2-chlorobutadiene-vinylidene cyanide-acrylonitrile terpolymer; esters of saturated di- or polyhydroxy compounds with olefinic carboxylic acids such as ethylene glycol dimethacrylate, triethylene glycol dicrotonate or glyceryl triacrylate; esters of olefinic alcohols with dicarboxylic acids or with olefinic monocarboxylic acids such as diallyl adipate, divinyl succinate, diallyl fumarate, allyl methacrylate or crotyl acrylate and other diethylenically unsaturated compounds such as diallyl carbonate, divinyl ether or divinylbenzene, as well as the cross-linked polymeric materials such as methyl methacrylate-diallyl methacrylate copolymer or butadiene-styrene-divinylbenzene terpolymer.

Polymerized materials prepared by subsequent reaction of the preformed vinyl polymers, e.g., polyvinyl alcohol, the polyvinyl acetals such as polyvinyl formal or polyvinyl butyral, or completely or partially hydrolyzed polyacrylonitrile, are likewise modified in properties by the present phosphate to give polymeric materials of enhanced utility.

Polymeric materials with which the present phosphate can be employed as adjuvants are also polymers which contain elements such as sulfur, phosphorus, boron or silicon, e.g., the sulfides, sulfones, sulfoxides, sulfites, sulfates and sulfonates such as the polymers and copolymers of vinyl sulfide, vinyl sulfone, 2-propenyl sulfoxide, ethylene sulfonic acid and its salts, esters and amides, and sulfonated polystyrene; the olefin-sulfur dioxide polymers, the phosphines, phosphites, phosphates and phosphonates such as diphenylvinylphosphine, allyl phosphite and methallyl phosphite, ethylenephosphonic acid and styrenephosphonic acids and their salts, esters and amides; the silanes such as dimethylvinylsilane, diphenylvinylsilane and methylphenylvinylsilane, etc.

A class of synthetic polymer materials with which the present phosphorus compound is very useful comprises the cellulose derivatives, e.g., the cellulose esters such as cellulose acetate, cellulose triacetate, or cellulose acetate butyrate, the cellulose ethers such as methyl or ethyl cellulose, cellulose nitrate, carboxymethyl cellulose, cellophane, rayon, regenerated rayon, etc. The phosphorus compound may be incorporated into films of such cellulose derivatives by adding it to the solutions from which the films are cast or into the melts from which the fibers are extruded.

The present posphate is particularly suited to the modification of liquid resin compositions of the polyester type, e.g., the linear polyesters which are obtained by the reaction of one or more polyhydric alcohols with one or more alpha, beta-unsaturated polycarboxylic acids alone or in combination with one or more saturated polycarboxylic acid compounds, or the cross-linked polyester resins which are obtained by reacting the linear polyester with a compound containing a

group.

The cross-linking component of the presently modified polyester resin may be, e.g., styrene, the nuclear or side-chained substituted styrenes such as 3,4-dichlorostyrene, α-chlorostyrene, α-methylstyrene; other vinyl-substituted hydrocarbons such as α- or β-vinylnaphthalene or 4-vinylbiphenyl; the olefinic carboxylic acids and the esters, nitriles, amides and anhydrides thereof such as acrylic acid, methacrylic acid, ethyl acrylate, or acrylonitrile; the vinyl esters such as vinyl acetate or vinyl chloroacetate; the olefinic ketones such as ethyl vinyl ketone and isopropenyl methyl ketones; the alkenes such as isobutylene and 2-pentene; the olefinic ethers such as vinyl ethyl ether and vinyl isobutyl ether; etc.

The epoxy resins are another class of polymeric materials with which the present compound is compatible and are advantageously used. These resins are condensation products formed by the reaction of a polyhydroxy compound and epichlorohydrin, which condensation products are subsequently cured by addition of cross-linking agents. The hydroxy compound may be, e.g., ethylene glycol, 4,4'-isopropylidenediphenol, etc. The cross-linking agent employed in the curing or hardening step may be a dicarboxylic compound such as phthalic anhydride or adipic acid, but is more generally a polyamine such as ethylene diamine, m- or p-phenylene diamine or diethylenetriamine.

The polyurethanes comprise another class of polymeric materials which are beneficially modified by the present phosphate. The polyurethanes, like the above-mentioned polyesters, are commercial materials which are employed in structural applications, e.g., as insulating foams, in the manufacture of textile fibers, as resin bases in the manufacture of curable coating compositions and as impregnating adhesives in the fabrication of laminates of woods and other fibrous materials. Essentially the polyurethanes are condensation products of a diisocyanate and a compound having a molecular weight of at least 62 and preferably about 1500–5000, and at least two reactive hydrogen atoms, i.e., hydrogen atoms determinable by the Zerewitinoff method. The useful active-hydrogen containing compounds may be polyesters prepared from polycarboxylic acids and polyhydric alcohols, polyhydric polyalkylene ethers having at least 2 hydroxy groups, polythioether glycols, polyesteramides, etc.

The polyesters of polyesteramides used for the production of the polyurethane may be branched and/or linear, e.g., the esters of adipic, sebacic, 6-aminocaproic, phthalic, isophthalic, terephthalic, oxalic, malonic, succinic, maleic, cyclohexane-1,2-dicarboxylic, cyclohexane-1,4-dicarboxylic, polyacrylic, naphthalene-1,2-dicarboxylic, fumaric, itaconic, etc., with polyalcohols such as ethylene glycol, diethylene glycol, pentaglycol, glycerol, sorbitol, triethanolamine, di-(beta-hydroxyethyl) ether, etc. and/or amino-alcohols such as ethanolamine, 3-aminopropanol, 4 - aminopropanol, 5 - aminopentanol-1, 6-aminohexanol, 10-aminodecanol, 6-amino-5-methylhexanol-1, p-hydroxymethylbenzylamine, etc.; and with mixtures of the above polyalcohols and amines, ethylene diamine, hexamethylene diamine, 3-methylhexylmethylene diamine, decamethylene diamine and m-phenylenediamine, etc. and/or amino-alcohols, etc. In the esterification, the acid per se may be used for condensation or, where desirable, equivalent components such as the acid halide or anhydride may be used.

The alkylene glycols and polyoxyalkylene or polythioalkylene glycols used for the production of the polyurethanes may comprise ethylene glycol, propylene glycol, butylene-glycol-2,3, butylene-glycol-1,3, 2-methylpentanediol-2,4, 2-ethylhexanediol-1,3, hexamethylene glycol, styrene glycol and decamethylene glycol, etc., and diethylene glycol, triethylene glycol, tetraethylene glycol, polythioethylene glycol, polyethylene glycols 200, 400 and 600, etc. dipropylene glycol, tripropylene glycol, trithiopropylene glycol, polypropylene glycols 400, 750, 1,200 and 2,000 etc.

Broadly, any of the polyesters, polyisocyanate-modified polyesters, polyesteramides, polyisocyanate-modified polyesteramides, alkylene glycols, polyisocyanate-modified alkylene glycols, polyoxyalkylene glycols and polyisocyanate-modified polyoxyalkylene glycols, etc., having free reactive hydrogen atoms, free reactive carboxylic and/or especially hydroxyl groups may be employed for the production of the polyurethanes. Moreover, any organic compound containing at least two radicals selected from the class consisting of hydroxyl and carboxyl groups may be employed.

The organic polyisocyanates useful for the production of the polyurethanes include ethylene diisocyante, ethylidene diisocyanate, propylene-1,2-diisocyanate, butylene-1,3-diisocyanate, hexylene-1,6-diisocyanate, cyclohexylene-1,2-diisocyanate, m-phenylene diisocyanate, 2,4-toluylene diisocyanate 2,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, triphenyl-methane triisocyanate, 1,5-naphthalene diisocyanate or polyisocyanates in a blocked or inactive form such as the bisphenyl carbamates of toluylene diisocyanate, p,p'-diphenylmethane diisocyanate, p-phenylene diisocyanate and 1,5-naphthalene diisocyanate, etc.

For preparation of the flame-retardant polyurethanes, the present phosphorus compound is preferably added to a mixture of the reactants and catalyst before hardening. The hardened molded pieces or foams are rendered flame-retardant by the inclusion therein of the phosphate in quantities of, say from 2% to 25% by weight of the polyurethane. (Simultaneous plasticizing property is evidenced and continues to be demonstrated as the quantity of phosphate is increased.) Use of the present phosphate in the polyurethane foams can also increase flexibility and, in some applications, improve the mechanical properties of the foams.

Phenolic resins are also beneficially modified by the present phosphate, which compound is incorporated into the resin either by milling in molding applications or by addition to film-forming or impregnating and bonding solutions previous to casting. Phenolic resins with which the present compound is employed are, for example, the phenol-aldehyde resins prepared from phenols such as phenol, cresol, xylenol, resorcinol, 4-butylphenol, 4-phenylphenol, and aldehydes such as formaldehyde, acetaldehyde, or butyraldehyde in the presence of either acidic or basic catalysts, depending upon whether the resin is intended for use as a molding or extruding resin or as the resin base in coating and impregnating compositions.

The aminoplasts comprise another group of aldehyde resins which are beneficially modified by the present phosphate. Examples thereof are the heat-convertible condensation products of an aldehyde with urea, thiourea guanidine, cyanamide, dicyandiamide, alkyl or aryl guanamines, and the triazines such as melamine, 2-chloro-4,6-diamino-1,3,5-triazine and 2-hydroxy-4,6-diamino-1,3,5-triazines. The present adjuvant is compatible with the aminoplasts; and depending upon the quantity of phosphate used, it serves to plasticize them, and to render them fire-retardant. When the aminoplasts are destined for use as impregnating agents, bonding adhesives, coatings and casting of films, the phosphorus compound is incorporated into solutions or suspensions in which the aminoplast is carried. The resulting mixtures give strong, fire-retardant laminates when sheets of paper, glass cloth or fabric are impregnated therewith and cured.

Also beneficially modified by the present phosphate are the nylons, i.e., the superpolyamides which are generally obtained by the condensation of a diamine, e.g., hexamethylenediamine with a dicarboxylic acid, e.g., adipic acid. Depending upon the quantity of phosphate employed and the individual nature of the compound, there are obtained flame-retardant, dye receptor, and/or plasticizing effects.

Other polyamides with which the present phosphate is beneficially employed, e.g., for improvement in reduced burning rates, are the polypeptides which may be prepared, e.g., by reaction of N-carbobenzyl oxyglycine with glycine or a mixture of glycine and lysine, or an N-carboxy amino acid anhydride such as N-carboxy-DL-phenylalanine anhydride; the polymeric lactams, e.g., polycaprolactam, piperidone, 2-oxohexamethyleneimine and other cyclic amides. The present phosphate can be incorporated into molding or extruding compositions for plasticizing and flame-retardant effect and/or to serve as mold lubricants.

The present phosphate is also advantageously employed as adjuvants for polymeric aldehydes, e.g., homopolymeric, high-molecular weight formaldehyde.

The present phosphate is also an adjuvant for linear polymers obtained by the self-condensation of bifunctional compounds generally, e.g., the polyethers which are derived by the self-condensation of dihydric alcohols such as ethylene glycol, propylene glycol or hexamethylene glycol; the polyesters which are obtained by the self-condensation of hydroxy acids such as lactic acid or 4-hydroxybutyric acid, the polyamides which are prepared by the self-condensation of amino carboxylic acids such as 4-aminobutyric acid or 6-aminocaproic acid; the polyanhydrides which are formed by the self-condensation of dicarboxylic acids such as sebacic acid or adipic acid, etc. The present phosphate is a plasticizing flame-retardant for such self-condensation products, generally; and where transparentizing effect and dye receptivity are lacking, the phosphates are often instrumental in ameliorating such deficiencies.

The present mixed phosphate is likewise advantageously employed with the silicone resins, i.e., the linear polymers which have the repeating unit:

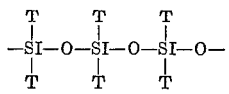

where T denotes an organic radical such as the methyl or phenyl radical, as well as the cross-linked modifications thereof, e.g., cross-linked polymeric divinyltetramethyldisiloxane.

The invention is further illustrated by, but not limited to, the following examples:

*Example 1*

To 1221 g. (9.66 moles) of 2-chloro-1,3,2-dioxaphospholane there was added 1521.5 g. of bromine (to the point of persistent bromine color) during a time of 0.7 hour while maintaining the temperature of the reaction mixture at 10–20° C. by dry ice cooling. A 9.5 g. portion of the reaction mixture was submitted for nuclear magnetic resonance study; a phosphorus chemical shift was observed at +14.9 relative to $H_3PO_4$. Another 95.5 g. portion of the reaction mixture was distilled through a 6″ column to give 91.1 g. of the substantially pure 2-bromoethyl phosphorobromidochloridate, B.P. 80–81° C./0.2 mm., $n_D^{25}$ 1.5225.

The remainder of the bromination product obtained above was warmed to 50° C. and 4.1 g. of titanium tetrachloride was added thereto to serve as catalyst for subsequent reaction with ethylene oxide. Addition of the oxide was started at 50° C. and during passage of 770 g. of the oxide into the reaction mixture, the temperature rose to 62° C. It was allowed to increase to 90° C. as another 82 g. of the oxide was added, and finally to a temperature of 105° C. as the remainder of the total 900 g. of oxide was added. The whole was maintained at 105–120° C. for 0.75 hour and then concentrated to 130° C./1 mm. to give as residue 3419 g. (98.2% of theory based on the 2-chloro-1,3,2-dioxaphospholane) of the substantially pure bis(2-bromoethyl) 2-chloroethyl phosphate, $n_D^{25}$ 1.5003. Distillation of a 253 g. portion gave 229.7 g., B.P. 180–182° C./0.1 mm., which analyzed as follows: Calc'd for $C_6H_{12}Br_2ClO_4P$: Br, 42.75%; Cl, 9.46%; P, 8.28%. Found: Br, 42.74%; Cl, 9.28%; P, 8.04%.

*Example 2*

This example shows preparation of bis(2-bromoethyl) 2-chloroethyl phosphate on a larger scale.

To 2,532 g. (20.0 moles) of 2-chloro-1,3,2-dioxaphospholane there was added during 0.8 hour 3151 g. of bromine while maintaining the temperature of the reaction mixture at 10–25° C. The rate of addition was determined by the rate of heat removal, since the bromine reacted instantaneously. A 6.5 g. sample was removed for NMR study. It had a chemical shift of +15.1 p.p.m. which is characteristic of 2-bromoethyl phosphorobromidochloridate.

The remainder of the bromination product was warmed to 45° C. and 6 g. of titanium tetrachloride catalyst was added thereto. A total of 1810 g. of ethylene oxide was passed into the resulting mixture in 3 hours as the temperature was allowed to rise to 120° C. Another 120 g. of the oxide was introduced while applying heat to maintain the temperature at 115–121° C. When the total 1930 g. of oxide had been added, the reaction mixture was concentrated to 130° C./1 mm. to give as residue 7,283 g. (97.3% theoretical yield based on the phospholane) of the substantially pure bis(2-bromoethyl) 2-chloroethyl phosphate; NMR chemical shift, +1.7 p.p.m.; $n_D^{25}$ 1.5004; $d_{25}^{25°}$ 1.7797; and analyzing as follows: Calc'd for $C_6H_{12}Br_2ClO_4P$: C, 19.24%; H, 3.23%; Br, 41.75%; Cl, 9.46%; P, 8.28%. Found: C, 19.62%; H, 3.37%; Br, 42.40%; Cl, 9.26%; P, 8.10%.

*Example 3*

Finely ground polystyrene was blended with either bis(2-bromoethyl) 2-chloroethyl phosphate or with tris-(2,3-dibromopropyl) phosphate, using a quantity of one of said phosphates equal to 4.0% by weight of the polystyrene. The resulting blends were extruded and pelletelized on a 1½″-extruder at 375° F. The blend which contained the bis(2-bromoethyl) 2-chloroethyl phosphate was molded at 500° F. into physical test specimens on an 8-oz. Reed injection molding machine to give colorless, molded test specimens. Under the same conditions, the blend which contained the tris(2,3-dibromopropyl) phosphate could not be molded at all owing to excessive carbonization and increased fluidity.

*Example 4*

This example illustrates the better thermal stability of polymer compositions containing a minor amount of bis(2-bromoethyl) 2-chloroethyl phosphate as compared with polymer compositions containing minor amounts of commercially available phosphorus halogen compounds.

For this comparative test, the following procedure was used.

Into a 16 x 150 mm. test tube there was weighed 2.0 g. of low molecular weight solid polystyrene. The polystyrene was melted by placing the test tube containing it into a salt bath maintained at a designated pre-determined temperature. For these tests a temperature of 280° C. was used to provide a reasonable rate of discoloration in an efficient period of time. After the polystyrene is in the bath (completely melted at this temperature) for 3 minutes, the tube containing it was taken out of the bath and with no delay there was added 0.2 g. of the test additive (10% by weight of compound) as drops of a liquid, or as solid adhering to a stirring rod if it is a solid at room temperature. Immediately after the addition of the additive, the test tube was placed back in the bath and timing was started with a stop watch. The tube containing the test sample was removed every 1–2 minutes depending on the rate of discoloration and compared with previously prepared color standards.

The color standards were prepared for comparing the decomposition of flame retardant additives and polystyrene as a function of time versus temperature. The standards were numbered 1 through 7.

The No. 7 standard was prepared by decomposing tris-(2,3-dibromopropyl) phosphate in a high temperature bath to a dark brown almost black color.

The No. 6 standard was made by mixing 20 cc. of calcium petronate, a highly refined petroleum sulfonate with 10 cc. of o-dichlorobenzene solvent.

The No. 5 standard was made by diluting the No. 6 standard with solvent in 1:1 volume ratio.

The No. 4 standard was prepared by diluting the No. 5 standard with solvent in a volume 1:1 ratio.

The No. 3 and No. 2 standards were prepared in a similar manner by diluting the standard having the next higher number with solvent in a 1:1 volume ratio.

The No. 1 standard was prepared by diluting the No. 2 standard with solvent in a 1:3 volume ratio.

The color of the test samples were noted and the time of the notation were recorded. The tests were completed when the sample reaches a No. 7 standard.

The test results were as follows for the indicated compounds:

| Additive | | Thermal Stability at 280° C. | | | |
|---|---|---|---|---|---|
| Tris(dichloropropyl) phosphate | Time (min.) | 1 | 1.5 | 2 | 2.5 |
| | Color | 1 | 3 | 6 | 7 |
| Tris(chlorobromopropyl) phosphate | Time (min.) | 1 | 1.5 | | |
| | Color | 2 | 7 | | |
| Bis(2-bromoethyl) 2-chloroethyl phosphate | Time (min.) | 1 | 1.5 | 2 | 2.5 |
| | Color | 1 | 2 | 3 | 4 |
| | Time (min.) | 3 | 5 | 6 | |
| | Color | 5 | 6 | 7 | |

Example 5

This example illustrates the comparative qualities of bis(2-bromomethyl) 2-chloroethyl phosphate with other phosphorus and halogen-containing compounds as flame-retardant additives in polystyrene under identical conditions.

The test procedure used for determining the relative value of the compounds as flame-retardant additives was the burn test procedure ASTM D-635-56T with the following modifications:

(1) 4 inch samples were used instead of the 5 inch samples of the defined test, and the gage lines were placed at 1 inch and 3.75 inches from one end of the sample.

(2) The hood used was completely enclosed except for the top and it is placed within another hood which is completely closed. The hood exhaust was turned off during ignition but turned on after ignition and left on during the rest of the test. This is done because of the heavy smoke and soot formed during burning.

Most of the test samples of polymer compositions containing the test compounds were prepared by the extrusion method using the following procedure:

A 113 g. portion of crystal polystyrene was weighed into a 400 ml. beaker. A 113 g. portion was used because it was found that approximately 13 g. of polystyrene remains in the barrel of the extruder; this amount enables the preparation of samples containing about 100 parts of styrene. To the weighed polystyrene there was added the calculated amount of the additive needed for the desired concentration of the additive based on the total weight of the polystyrene plus additive. The additive and polystyrene were then blended with a stainless steel spatula. The resulting composition was extruded using a ⅛" die. The extruded composition was ground in an Abbe grinder, type No. 000 and extruded a second time, and re-ground to blend the composition more thoroughly and obtain more uniform samples. Then 40 g. portions of the ground blended polymer compositions containing the additive were molded into 4 inch by 4 inch by ⅛ inch sheets in a Carver press at 170° C. and 10,000 lbs. load for three minutes. These sheets are cut into 4 inch by ½ inch by ⅛ inch samples and used in the burn test.

Some additives which could not be extruded in polystyrene were incorprated therein by a Mill Roll method in which the polystyrene and additive were blended on hot mill rolls (approximately 200° C.).

Either of two descriptions was assigned as describing the burning quality of polymer samples which did not burn.

1. Non-burning
2. Self-extinguishing

A polymeric composition sample was considered "non-burning" (NB) if there was no evidence of burning (flame or progressive glow) beyond the first gage mark. A "self-extinguishing" (SE) sample was one that continues to burn after removal of the burner but the flame goes out before the second gage line was reached. From 3 to 7 samples of each polymer composition were tested. If the sample did not meet these requirements, it was classified as a "burning" (B) sample.

The results of the burn test are given comparing the burn qualities of polystyrene control samples (no additive), samples containing bis(2 - bromoethyl)2 - chloroethyl phosphate, and some commercially available phosphorus and halogen containing compounds.

| Additive | Percent Conc., wt./wt. | Aver. Burn Time (sec.) | Burn Class | Aver. Percent Burn |
|---|---|---|---|---|
| Tris(dichloropropyl)phosphate | 10 | 231 | SE | 75.3 |
| Tris(2-chloroethyl)phosphate | 10 | 222 | SE | 60.7 |
| Bis(2-bromoethyl) 2-chloroethyl phosphate | 10 | 0 | NB | 0 |
| | 8 | 0 | NB | 0 |
| | 6 | 219 | SE | 64.3 |

The above burn test data are based on the burn testing of seven samples of each polymer composition.

Example 6

This example illustrates the stability or resistance of organic polymer compositions containing bis(2-bromoethyl) 2-chloroethyl phosphate to ultra-violet light radiation, in comparison with the effectiveness of a commercial phosphorus and halogen compound added for the same purpose.

The following procedure was used:

A 20% by weight solution of polystyrene in toluene was first prepared by stirring 300 g. of polystyrene, portionwise, into 1200 g. of toluene. Into a glass, screw capped vial, 21 x 70 mm., 10 g. of the 20% solution of polystyrene in toluene was weighed. After noting the level of the solution other vials of the same measurements were filled to the same level as needed for the number of additives to be tested. Then 0.2 g. of each of the respective additives was placed in vial, and stirred to uniformity. This gives a composition containing 10% of additive. If the additive was a thick liquid or a solid it was diluted to a 50% solution in toluene or even to a more dilute solution until solution was obtained. Then 0.4 g. of the additive or more as appropriate was placed in the polystyrene solution to provide 0.2 g. of additive. The resulting solutions of polystyrene plus additive were cast into films on glass slides 2 x 3 inches and 1.1 to 1.3 mm. thick using a 0.008 film caster. The samples thus obtained were placed in an exhaust oven overnight to evaporate the toluene. This leaves a thin film of polystyrene plus additive on the glass slide. Sample films which become cloudy because of slow toluene evaporation were re-cast on glass slides and placed under sun lamps for a few minutes to evaporate the toluene quickly.

The film sample slides thus obtained were placed in an enclosed ultra-violet light apparatus containing 8 ultra-violet sun lamps suspended 2″ above a turn table on which the samples were mounted. The turn table was of 24″ diameter and was rotated at 6 revolutions per minute. The heat was substantially dissipated by use of a fan and vent in the apparatus.

Before the samples were treated in the ultra-violet light apparatus the absorbance (A) of each film was determined using a light having a wave length of 420 millimicrons on a Model Cary 14 spectophotometer. A glass slide having no film thereon was subjected to the same test to determine the absorbance thereof. The absorbance of the polystyrene plus additive film was determined by noting the difference between the slide with no film and the slide with the film. This was recorded as the initial absorbance. The samples were then placed on the turn table in the ultra-violet light apparatus. The apparatus was started and at stated time intervals (hours) the samples were tested for absorbance as before and the time was noted. When a total of 70 hours of exposure had been reached, the test was completed. A final reading of absorbance was taken and noted.

The absorbance of each sample using an ultra-violet light having a wave-length of 420 millimicrons for the indicated number of hours were as follows:

| Additive | Time (hours) | A |
| --- | --- | --- |
| Tris(2,3-dibromopropyl) phosphate | 70 | .405 |
| Bis(2-bromoethyl) 2-chloroethyl phosphate | 70 | .19 |

The lower A is, the more transparent the film to 420 m$\mu$ light.

$$(A)\ \text{Absorbance} = \log_{10} \frac{I_o}{I}$$

where:

$I_0$ = intensity of incident light on the film alone
$I$ = intensity of existing light from the films alone The more transparent the film, the less the coloring of the polymer system by ultra-violet light.

Example 7

This example compares the effectiveness of bis(2-bromoethyl) 2-chloroethyl phosphate with some commercially available phosphate esters in rigid polyurethane foam compositions.

Rigid polyurethane foam compositions containing the various halogenated phosphate esters were prepared as follows:

To a mixture of 63.4 parts of a polyoxypropylene triol having an average hydroxyl No. of 379.5, approximately 0.05 part of stannous octoate as catalyst, from 12.6 to 16 parts of trichlorofluoromethane as blowing agent, 0.3 part of a water soluble organo-silicon oil co-polymers having a viscosity of about 900 centistokes at 25° C. and specific gravity of 1.3 as a foam stabilizer, and the indicated percentage (below) of one of the phosphate esters, there was added 36.6 parts of tolylene diisocyanate. As foaming started the resulting reaction mixture was poured into a kraft paper container and allowed to set until cured. Higher amounts of blowing agent were used with the higher concentrations of additives to make a uniform density foam. The foams thus prepared were burned using ASTM–D1692–59T giving the results tabulated in the following table:

| Phlsphate Compound | Percent Added (based on wt. of total composition) | Percent Burned |
| --- | --- | --- |
| Control (no phosphate) | None | 100 |
| A | 6 | 67.4 |
|   | 8 | 18.5 |
|   | 12 | 12.2 |
|   | 16 | 1.8 |
| B | 6 | 77.1 |
|   | 8 | [1] 33.35 |
|   | 12 | 14.6 |
|   | 16 | 4.8 |
| C | 6 | 100 |
|   | 8 | 100. |
|   | 12 | 24.7 |
|   | 16 | 11.5 |

[1] Average.
A is bis(2-bromoethyl) 2-chloroethyl phosphate; B is tris(2-chloroethyl) phosphate; C is tris(2,3-dichloropropyl) phosphate.

Example 8

This example illustrates the prepartion of polyester laminate compositions containing bis(2-bromoethyl) 2-chloroethyl phosphate as a flame retardant therefor.

A polyester-catalyst solution was prepared by mixing 123.7 g. of a polyester copolymer with 3.82 g. of curing catalyst. The polyester was a copolymer of propylene glycol and about equimolar amounts of maleic anhydride and phthalic anhydride, with the propylene glycol being in about 10% molar excess relative to the combined content of the maleic and phthalic anhydride dissolved in styrene monomer which polymerizes with the maleic anhydride upon curing. This polyester had a heat distortion temperature of 120° C. at 264 p.s.i. 2° C./min. The catalyst was a commercially available 50%–50% by weight, mixture of benzoyl peroxide and tricresyl phosphate.

To 90 g. of the above polyester-catalyst mixture there is added 22.5 g. of bis(2-bromoethyl) 2-chloroethyl phosphate to give a composition containing 20% by weight of the phosphate ester.

About 75 g. portions of the resulting polyester-phosphorus compound mixture were used to prepare laminates by applying about one-fifth, by volume, of the composition to one side of a 4.5 x 4.5 inch sheet of 8 oz. fiber glass. The mat was laid on a piece of cellophane on glass, treated side down, and the fiber glass mat was treated with another portion of the polyester-phosphate ester composition. A second fiber glass mat was placed on the polyester treated fiber glass mat, and then another one-fifth portion of polyester-phosphate ester composition. This was continued until a total of four fiber glass mats were enclosed in five layers of polyester-phosphate ester composition. Another piece of cellophane was placed on top of the finished laminate of polyester and fiber glass. The finished laminate, encased in cellophane films was sandwiched between pieces of aluminum foil and placed in Carver press at room temperature with 0.126 in. spacer rods placed at opposite sides of the laminate. Then the temperature was slowly raised and pressure was applied to the Carver press and laminate composition until the composition showed signs of gelation. Then the temperature was raised to 130° C., and the pressure to 1000 p.s.i. and allowed to stay at such temperature and pressure for 1 hour. After cooling for 5 minutes while under pressure the polyester-phosphate laminate composition was removed from the press, the aluminum foil was removed, and the laminate was placed in an hot-air oven for 1 hour at 120° C. for a post-cure.

Samples of laminates 5.5″ x .5″ x ⅛″, were mounted horizontally and ignited for at least 10 seconds by a one inch high Bunsen flame. Longer ignition times were used on the less flammable samples. Ignition was confined to the outermost half inch of sample. After ignition the samples were observed for the time to self-extinguishment. If the sample was not self-extinguishing the burning rate along the sample was measured.

Using the test procedure, 5 samples of the polyester laminate containing 10% by weight of bis(2-bromoethyl) 2-chloroethyl phosphate were burned. All were self-extinguishing. The average percent of burn for the five samples was only 5.00%.

*Example 9*

Bis(2-bromoethyl) 2-chloroethyl phosphate is useful as a flame-retardant to polyester compositions. The following exemplifies how the composition is prepared.

To 18.4 parts of a commercially available polyester copolymer prepared by condensing 2.1 moles of propylene glycol, 1 mole of phthalic anhydride, and 1 mole of maleic anhydride, processed to an acid number of about 40 at 200° C., cooled to room temperature and dissolved in styrene monomer which polymerizes with the maleic anhydride upon curing, said styrene comprising 1 part of the composition with 2 parts of the polyester, there is added 0.6 part of 50% benzoyl peroxide as catalyst, and 1.0 part of the bis(2-bromoethyl) 2-chloroethyl phosphate as additive to make 20 parts of a polyester composition containing the additive in 5% by weight concentration.

Polyester compositions containing 10% by weight and 17.5 by weight of each additive may also be prepared by admixing the ingredients in the following proportions:

|  | 10% Additive, parts | 17.5% Additive, parts |
| --- | --- | --- |
| Polyester | 17.4 | 15.9 |
| Catalyst | 0.6 | 0.6 |
| Additive | 2.0 | 3.5 |
| Total | 20.0 | 20.0 |

*Example 9*

This example illustrates the preparation of epoxy polymeric compositions containing major proportions of polyepoxy resins and minor proportions of bis(2-bromoethyl) 2-chloroethyl phosphate.

With 3 g. of a commercially available condensation product of linoleic acid and a polyamine having an amine value of from 290–320 and a viscosity of 80–120 poises at 40° C. there is mixed 7 g. of the diglycidyl ether of Bisphenol A and a sufficient amount of bis(2-bromoethyl) chloroethyl phosphate to make a composition having 10% by weight based on the weight of the total composition, of the bis(2-bromoethyl)chloroethyl phosphate and the resulting reaction mixture is poured into a small aluminum pan which had been coated with a silicone grease to prevent sticking. The product is heated in an oven at 100° C. for two hours.

*Example 10*

Flexible polyurethane foam compositions containing various percentages of bis(2-bromoethyl) 2-chloroethyl phosphate are prepared as follows:

A first prepared mixture of 650 parts of a polyoxypropylene triol having a hydroxyl number of 56.3 (prepared from glycerin and propylene oxide), 6.5 parts of a silicone surfactant used as a foam stabilizer, 1.95 parts of stannous octoate, 3.25 parts of N-methyl morpholine, and 0.325 part of 1-methyl-4-(dimethylaminoethyl)piperazine, as catalysts, is blended for 0.5 hour at 25° C., and divided into portions of 101.85 g.

To one portion of 101.85 g. of the above mixture there is added 9.11 g. of bis(2-bromoethyl) 2-chloroethyl phosphate, 2.9 g. of water, and then, after stirring the mixture for 30 seconds, 38 g. of tolylene diisocyanate was added, and the mixture was stirred until foaming started, and then it is poured into a container lined with aluminum foil, which had been preheated to 100° C. After covering the foaming mixture, it is heated at 100° C. for 4 minutes in a forced air oven, removed from the oven, squeezed to one-half its initial thickness, and then placed in an oven at 130° C. for 1 hour. This polyurethane foam contains 6% by weight of the bis(2-bromoethyl) 2-chloroethyl phosphate.

Other polyurethane foam compositions are prepared so as to contain 8% and 10% quantities of bis(2-bromoethyl) 2-chloroethyl phosphate in a similar manner. Thus, to make a polyurethane foam composition containing 8% of the above additive, there is added 12.44 g. of the above compound to a 101.85 g. portion of the mixture; to make a foam composition containing 10% of the additive 16.00 g. of the bis(2-bromoethyl) 2-chloroethyl phosphate is used, the other ingredients of the composition remaining in the same proportions as indicated above.

*Example 11*

To 100 parts of a polyvinyl chloride resin there is added 50 parts of a 10:1 mixture of dioctyl phthalate and bis (2-bromoethyl) 2-chloroethyl phosphate as plasticizer/ flame retardant. The combination is placed on hot mill rolls and blended. When thoroughly blended, the product is stripped from the roll and pressed into 4" by 4" by 1/16" square shaped pieces which were soft, pliable plastic. After a two week period, the sample shows no loss of the bis(2-bromoethyl) 2-chloroethyl phosphate.

*Example 12*

Rigid polyurethane foam compositions containing bis (2-bromoethyl) 2-chloroethyl phosphate are prepared as follows:

To a mixture of 63.4 parts of a polyoxypropylene triol having an average hydroxyl number of 379.5, 0.05 part of stannous octoate as catalyst, from 12.6 to 16 parts of trichlorofluoromethane as blowing agent, and 0.30 part of a water soluble organo-silicone oil copolymer having a viscosity of about 900 centistokes at 25° C. and a specific gravity of 1.03 as a foam stabilizer, and 6% by weight of bis(2-bromoethyl) 2-chloroethyl phosphate, there is added 36.6 parts of tolylene diisocyanate and as foaming started the reaction mixture is poured into a kraft paper container and allowed to set until cured.

*Example 13*

Fire resistant polymer compositions are made by mixing samples of a commercial cellulose acetate butyrate having an average acyl content of 13.0 percent acetyl and 37 percent butyryl and a viscosity range of 17–33 seconds (64–124 poises) as determined by ASTM method D–1343–54T in the solution described as Formula A, ASTM method D–871–54T are blended on hot mill rolls and 10% of bis(2-bromoethyl) 2-chloroethyl phosphate.

*Example 14*

To melted samples of a high molecular weight low density polyethylene having a density of 0.918, a melt index of 0.3 gm./10 minutes, a softening temperature of 105°–110° C. and a tensile strength (ultimate) of 2300 p.s.i.g. there is added an amount of bis(2-bromoethyl) 2-chloroethyl phosphate sufficient to make compositions wherein the added bis(2-bromoethyl) 2-chloroethyl phosphate comprises from 4 to 8% of the total weight of the composition were added. All samples containing as little as 4% by weight of the additive are self-extinguishing.

*Example 15*

To melted samples of a commercial rigid polymethylmethacrylate polymer blended on hot mill rolls there is added 10% by weight of bis(2-bromoethyl) 2-chloroethyl phosphate which is sufficient to impart flame resistant properties thereto.

*Example 16*

Wood, paper, and cotton are impregnated with bis(2-bromoethyl) 2-chloroethyl phosphate using the following procedure:

Using a volatile solvent, such as ethyl alcohol the bis(2-bromoethyl) 2-chloroethyl phosphate additive is dissolved in the solvent, and wood, paper, or cotton are soaked in the resulting solution. The solvent is then evaporated off leaving the additive impregnated in the wood, paper, or cotton. To obtain more rapid absorption, the wood, is soaked in the impregnating solution under vacuum.

By experimentation we found that to obtain an impregnated wood having about 7.5% by weight of additive therein, a 15% solution of the additive is needed when ethyl alcohol is used as solvent. On this basis it is then possible to obtain desired varied percentages of additive in the wood, paper, or cotton by varying the percent of additive in the impregnating solution. The solution needed to obtain a desired percentage of additive in the wood, paper, or cotton is roughly 2 times the percentage desired in the impregnated material.

The wood impregnation procedure is as follows:

Maple wood strips, 6 by ¾ by ¹⁄₁₆ inches, are dried in an oven at 130° C. for at least 15 minutes and then weighed. The wood strips are then placed in test tubes containing 60 cc. of solution containing the desired percent of additive as indicated above. The test tubes containing the wood in the impregnating solution are then placed under a vacuum of 130 to 135 mm. Hg, slowly at first to prevent foaming of the impregnating solution. After 3 minutes the vacuum is relieved and the open system is allowed to stand for 1 minute after which time the wood is removed, wiped once with a paper towel and weighed. The wood strips are air dried for two minutes and then in an oven at 130° C. for 30 minutes. The percent additive in the wood was calculated as follows. Calculate percent additive in wood as follows:

Let
$x$=dry weight of wood
$y$=dry weight of wood+weight of solvent and additive picked up in impregnation
$Z$=weight ratio of additive to solvent prepared for impregnation, then $$\text{percent additive in wood} = \frac{(y-x)Z}{x+(y-x)Z} \cdot 100$$

Wood samples containing about 7% by weight of the additive are prepared by the above procedure. Solutions of ethyl alcohol containing 15% by weight of the chemical are used to make wood samples having 7% of the added chemical.

Strips (6″ by 2″) of paper (Whatmann filter paper No. 3) are dried in an oven at 130° C. for 10 minutes and then weighed. The weighed strips of paper are placed in glass bottles containing about 50 cc. of a solution of ethyl alcohol having about 10% or less of the bis(2-bromoethyl) 2-chloroethyl phosphate. The bottles are tilted if necessary to cover completely the paper strips with impregnating solution. After 1 minute the paper is removed, shaken to remove excess solution, and pressed between two paper tissues with a 1000 gram weight. The paper strips are weighed, and dried in air for 2 minutes and then in an oven at 130° C. for 10 minutes. It is found by experimentation that to obtain an impregnated paper having about 6% by weight of the added chemical, a solution of about 9% by weight of the chemical in the solvent was needed.

Cotton patches are impregnated in the same way as the paper samples with bis(2-bromoethyl) 2-chloroethyl phosphates. To obtain the desired percentage of additive in cotton it is found by experimentation that a 5% by weight concentration of added chemical in a ethyl alcohol solvent is needed to give a 4% by weight concentration of the chemical in cotton.

*Example 17*

Flame-retarding effects also are obtained when bis(2-bromoethyl) 2-chloroethyl phosphate is added to a 10% solution of a 50:50 molar ratio styrene-methyl methacrylate copolymer in benzene in an amount sufficient to be 5% by weight of the total solids content. Films are then cast from the resulting mixture.

*Example 18*

A copolymeric composition having improved burn resistant properties is also obtained by adding bis(2-bromoethyl) 2-chloroethyl phosphate in an amount sufficient to be 5% by weight based on the weight of the total solids content of a 10% benzene solution of a 72:28 molar ratio styrene-acrylonitrile copolymer.

*Example 19*

To a granular blend of a polystyrene and butadiene-styrene copolymer containing 6.5% by weight of the copolymer there is added 4% by weight of bis(2-bromoethyl) 2-chloroethyl phosphate by blending for 15 minutes in a tumbling type laboratory blendor. The mixture is then extruded through a 1″ single screw extruder at 400° F. into ³⁄₁₆″ diameter rods.

Extruded rods of the above composition are self-extinguishing upon removal from a Bunsen burner flame in a draft free hood. A similarly extruded blend of polystyrene and butadiene-styrene copolymer containing none of the above compound continues to burn rapidly, drip flame, and emit heavy black smoke after the first ignition.

*Example 20*

To a 10% ethylene dichloride solution of polyvinyl acetate there is added sufficient bis(2-bromoethyl) 2-chloroethyl phosphate in a quantity which is 3% by weight to that of the polyvinyl acetate present in the solution. Films cast from the resulting mixture are flexible and show reduced burning rates.

*Example 21*

To a 5% solution of a polyvinyl formal in ethylene dichloride there is added bis(2-bromoethyl) 2-chloroethyl in a quantity which is 10% by weight of the total solids content of the solution. Films cast from such solution are clear and colorless after air-drying for 24 hours and when held just outside the outer cone of a Bunsen burner flame, exhibit no ignition to flame. Films of polyvinyl formal, alone that is, "controls" prepared in the absence of a phosphorus compound, burst into flame under the same circumstances.

Since the quantity of the present phosphate which is employed with the polymeric material will vary with the adjuvant effect sought, and with the nature of the polymer, it is evident that no rigid limits of phosphate content can be set forth. For many purposes, particularly when only reduction of burn-rate, rather than self-extinguishing properties, is desired, as little as 1% or even less can be used. For other purposes, e.g., plasticizing effect, concentrations may be from about 5% to 50% by weight of the polymer give useful results. Determination of the optimum quantities is readily conducted by routine procedures, as will be apparent to those skilled in the art. Variations of the phosphates and quantities employed in the examples can be made to accommodate different requirements. The same processes as illustrated in the above examples have been found to be satisfactory for employing different vinyl polymers, or different condensation polymers than those used in the examples.

Although the present phosphate confers a variety of beneficial properties to polymeric materials, it may be used with other additives which are customarily employed as adjuvants for polymeric materials. Inasmuch as the present phosphate is substantially unreactive with the usual, commercially available polymer adjuvants, the use of such adjuvants with the phosphate is permissible and in many instances is desirable, e.g., filters, dyes, crosslinking agents, foam-producing agents, fungicides, etc. may be used.

Polymeric materials containing the presently provided mixed phosphate may be molded, extruded, calendered, spread, or sprayed. Typical applications for the materials include molded, cast or extruded objects, continuous sheetings, tubing, fibers, films, wire coatings, textile coatings, laminates, paints, varnishes and enamels, wood preservatives, adhesives, and caulking compounds.

Other modes of applying the principles of this invention may be employed instead of those specifically set forth above, changes being made as regards the details herein disclosed, provided the elements set forth in any of the following claims or equivalents thereof be employed.

What is claimed is:

1. An organic material comprising a polymer selected from the group consisting of natural and synthetic, linear and cross-linked polymers in contact with up to an equal amount based on the weight of the total composition of bis(2-bromoethyl) 2-chloroethyl phosphate.

2. An organic composition according to claim 1 wherein the organic polymer is a synthetic polymer.

3. An organic composition as described in claim 2 wherein the synthetic polymer is a polyurethane.

4. An organic composition as described in claim 2 wherein the synthetic polymer is a polyester polymer.

5. An organic composition as described in claim 2 wherein the polymer is derived at least in part from styrene.

6. An organic composition comprising a rigid polyurethane and as a flame retarding additive therefor from about 1 to about 50% by weight, based on the total composition of bis(2-bromoethyl) 2-chloroethyl phosphate.

7. An organic composition comprising polystyrene and from about 1% to about 50% by weight, based on the weight of the total composition of bis(2-bromoethyl) 2-chloroethyl phosphate.

8. An organic composition as described in claim 2 wherein the synthetic polymer is a polymethylmethacrylate polymer.

References Cited
UNITED STATES PATENTS

| | | | |
|---|---|---|---|
| 3,010,988 | 11/1961 | Raffelson et al. | 260—461 |
| 3,093,599 | 6/1963 | Mueller-Tamm et al. | 260—2.5 |
| 3,171,819 | 3/1965 | Powanda | 260—45.7 |
| 3,264,248 | 8/1966 | Lee | 260—30.6 |

DONALD E. CZAJA, *Primary Examiner.*

LEON J. BERCOVITZ, *Examiner.*

M. J. WELSH, *Assistant Examiner.*